Feb. 3, 1970  G. H. SERVOS ET AL  3,493,949
METHODS OF AND APPARATUS FOR MEASURING AND/OR
LOCATING TEMPERATURE CONDITIONS
Filed April 11, 1966
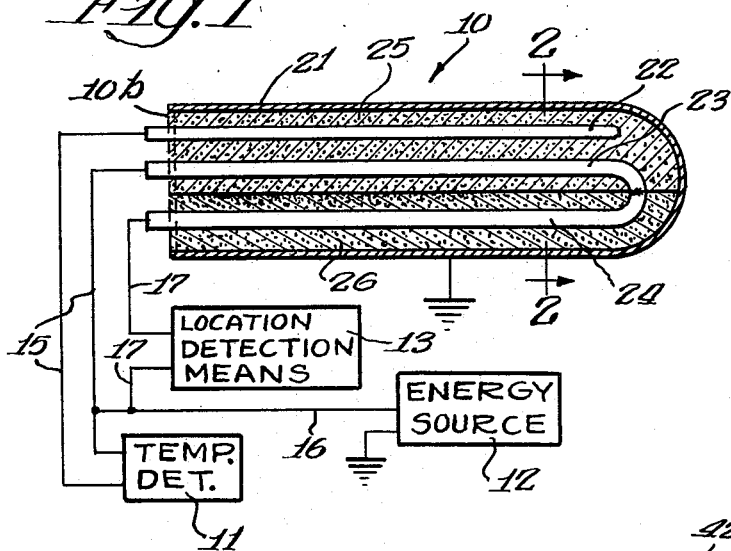
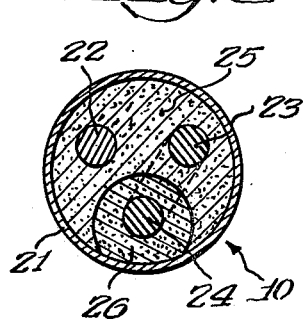
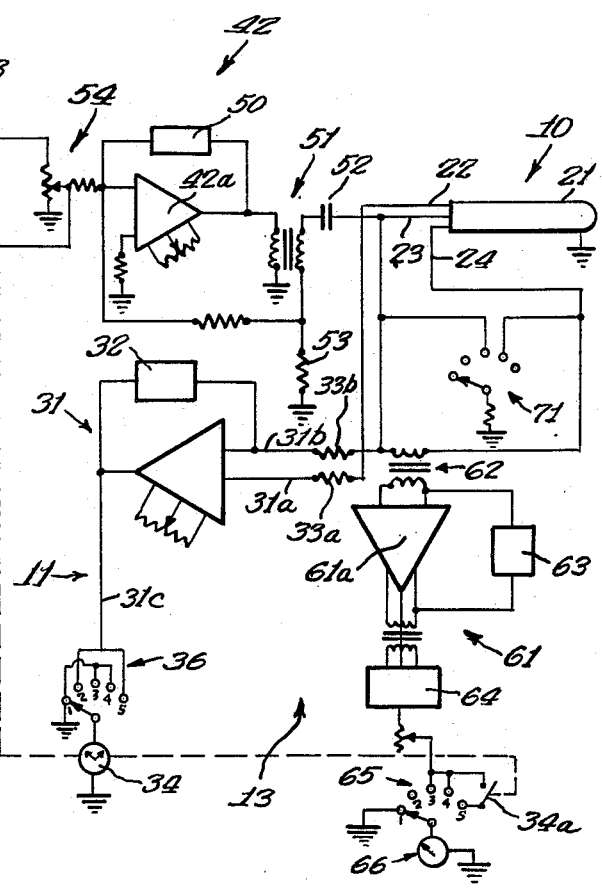
Inventors:
Gerald H. Servos
Kenneth R. Horning
By Hume, Groen, Clement & Hume Attys United States Patent Office 3,493,949
Patented Feb. 3, 1970

3,493,949
METHODS OF AND APPARATUS FOR MEASURING AND/OR LOCATING TEMPERATURE CONDITIONS
Gerald H. Servos, Elmhurst, and Kenneth R. Horning, Chicago, Ill., assignors to Continental Sensing, Inc., Melrose Park, Ill., a corporation of Illinois
Filed Apr. 11, 1966, Ser. No. 541,569
Int. Cl. G08b 21/00; G01k 1/08, 5/18
U.S. Cl. 340—228                  9 Claims

ABSTRACT OF THE DISCLOSURE

Method and apparatus for measuring and locating a temperature condition within an environment. The apparatus includes a thermoelectric transducer, an energy source, a temperature detector and a location detector. The transducer comprises a pair of thermocouple conductors surrounded by thermistor material and encased in a metallic sheath. The transducer is disposed within the environment and the temperature detector is connected to sense the thermoelectric voltage resulting from the junction across the thermistor material at the hottest point along the transducer. Constant alternating current is supplied to one of the conductors to create a voltage drop therealong between the point of supply and the hot junction. The current returns through the sheath. The voltage drop is measured by means of a third conductor attached to the far end of the conductor to which the current is supplied, and is converted into an indication of the location of the hot junction. Location detection may be initiated automatically in response to a predetermined temperature condition.

---

This invention relates to temperature measurement and, more particularly, to methods of and apparatus for measuring and/or locating temperature conditions of interest within an environment as detected by a suitable thermoelectric transducer.

It is an object of the present invention to provide improved means for and methods of effecting temperature measurements.

It is a further object of the present invention to provide means for and methods of carrying out temperature measurements and, in response thereto, selectively determining the location of particular temperature conditions of interest within an environment.

Still another object of the present invention is to provide methods of and means for efficiently determining the location of a particular temperature condition of interest that may arise within an environment.

Other objects and advantages of the present invention will become apparent from the following description of one preferred embodiment thereof, particularly when considered in conjunction with the accompanying drawing wherein:

FIGURE 1 is a block diagram illustrating one preferred embodiment of a system for measuring and/or locating temperature conditions of interest within an environment;

FIGURE 2 is a cross-sectional view taken along the line 2—2 in FIGURE 1; and

FIGURE 3 is a more detailed block schematic of the embodiment of the system illustrated in FIGURE 1.

As generally outlined above, the present invention contemplates methods of and apparatus for measuring and/or locating temperature conditions of interest within an environment as detected by a suitable thermoelectric transducer. In this latter connection, an elongated thermoelectric transducer is preferably disposed within the environment to be monitored and is arranged so that the temperature conditions of the environment at any desired location are sensed. The thermoelectric transducer is suitably constructed to function in accordance with the well-known Seebeck effect whereby temperature representative, thermoelectric signals or voltages are generated in response to the transducer being exposed to environmental temperature conditions that differ from ambient conditions. More specifically, the thermoelectric transducer is preferably constructed both of materials which exhibit appropriate thermoelectric properties and of materials characterized by a negative temperature coefficient of resistance. These materials are cooperatively arranged to form the transducer so that the thermocoupled junctions which yield the temperature representative, thermoelectric voltages are created through the negative temperature coefficient of resistance material. Accordingly, even though various segments of the elongated transducer are exposed to different temperature conditions which tend to generate corresponding thermoelectric voltages, the output of the transducer will yield a voltage signal indicative of the most extreme temperature condition to which one segment thereof has ben exposed.

The present invention contemplates that the thermoelectric voltage, which is representative of the maximum temperature to which a segment of the transducer is exposed, may be employed to effect one or more desired functions. That is, this thermoelectric signal may be utilized to yield a temperature reading and/or to initiate the determination of the location of this maximum temperature condition or both. In this latter connection, if the maximum temperature condition falls outside of a preselected temperature range, suitable means are preferably employed to supply energy to the transducer from an external source in response to the sensing of this temperature condition. Thereafter, the response of the transducer to the supplied energy is monitored, and the electrical characteristics of the monitored transducer response are converted to yield a direct indication of the location of the segment of the elongated transducer that is exposed to the maximum temperature condition.

The methods and apparatus of the present invention can be suitably and reliably employed in any number of situations wherein it is important to both monitor temperatures and/or determine the location of environmental conditions which generate temperatures falling without a preselected range. One of the many practical areas of utilization of the present invention is found in the monitoring of environmental conditions within high temperature enclosures such as aircraft engines, furnaces, nuclear reactors, etc. In such circumstances, one or more suitably constructed metallic sheathed thermoelectric transducers can be arranged within the enclosure so as to effectively monitor the temperature characteristics of substantially the entire confined region or selected portions thereof. Should a "hot spot" or other adverse high temperature condition occur within the monitored environment, such a condition is indicated by the thermoelectric voltage or signal generated from the segment of the thermoelectric transducer that is directly exposed to this temperature condition.

Assuming that this temperature condition falls without the limits of a preselected temperature range dictated, for example, by safety considerations, the temperature indicative signal can be utilized to immediately initiate a location determination. As generally outlined above, the location determination is effected as a result of the transducer being supplied with energy from an external source and as a further result of monitoring the electrical response characteristics of the transducer to the supplied energy. Thus, for any number of manufacturing, research and other applications, the present invention provides a system for accurately monitoring temperature conditions and/or when such temperature conditions dictate, a system for determining the location of a particular region of the monitored environment wherein a temperature condition of interest has developed.

Referring more specifically to FIGURE 1, a preferred embodiment of the system outlined above is illustrated in block diagram form and is shown as being comprised of suitable thermoelectric transducer 10, a temperature detecting means 11, an external energy source 12, and a location detecting means 13. In accordance with the invention, the temperature detector 11 and other system components 12 and 13 are suitably electrically connected to the transducer 10 so that temperature and/or location determinations can be reliably and compatibly effected. In this latter connection, the temperature detecting means 11 is connected to the transducer 10 through suitable circuit means represented by the numeral 15. The energy source 12 is similarly connected to the transducer 10 through circuit means 16 and a portion of the circuit means 15, while the location detecting means 13 is coupled to the transducer 10 through circuit means generally designated by the numeral 17. As hereinafter more fully set forth, the input to the location detecting means 13 is characterized by an extremely high alternating current impedance while the energy source 12 is characterized by a high direct current input impedance.

An appreciation of the operating characteristics of a system embodying the present invention are best derived from a consideration of both the external circuit components and the thermoelectric transducer itself. In this connection, the transducer 10 can be constructed in various forms to produce both the necessary temperature indicative thermoelectric voltages and so as to be suitably responsive to externally supplied energy to yield an indication of the location of the maximum temperature condition to which a segment of the transducer is exposed.

For example, the embodiment of the transducer 10, as shown particularly in FIGURES 1 and 2, is preferably comprised of an external, temperature resistant sheath 21 and a plurality of conductors 22, 23, and 24 that extend into the enclosed region defined by the sheath to adjacent the terminal end 10a thereof and that project from the opposite end 10b of the sheath. Layers 25 and 26 of appropriate insulating materials are utilized to maintain the co-extensive conductors 22, 23, and 24 in spaced relation to each other and to the sheath 21. In this latter connection, the conductors 22 and 23, which are preferably fabricated from suitable dissimilar thermoelectric materials (e.g. Alumel and Chromel), are confined within the layer 25, which is preferably characterized by a negative temperature coefficient of resistance. On the other hand, the conductor 24 is confined within the co-extensive layer 26 which is preferably formed of conventional, high temperature insulating medium such as magnesium oxide. With specific reference to FIGURE 2, the major portion of the interior of the sheath, which accommodates the conductors 22 and 23, is filled with the semiconductor medium (e.g. a composite of manganese, in principal part, silicon, lead, aluminium, barium and other minor constituents) that comprises the layer 25 while the remaining lower portion of the region enclosed by the sheath 21 wherein the conductor 24 is maintained is filled with the MgO. As shown in FIGURE 1, the inner end of the conductor 23 is physically and electrically connected to the end of the conductor 24 which is preferably a conductive material such as stainless steel.

It will be appreciated that the illustrated embodiment of the transducer 10 and other suitable variations thereof incorporating the layer of negative temperature coefficient of resistance insulating material are fabricated so that one or more thermoelectric junctions are created between the dissimilar thermoelectric materials employed in the transducer construction in response to the transducer being exposed to environmental temperature conditions which suitably differ from the ambient temperature conditions. In this connection, the free and coextensive ends of the conductors 22, 23, and 24 that extend from confined relationship within the sheath 21 are selectively connected through the aforedescribed circuit means to the various system components that are employed to effect the recording of temperature measurements and/or the determination of the location of those segments of the transducer 10 that are exposed to particular temperature conditions of interest.

More particularly and as an aid to a full appreciation of the characteristics of the embodiment of the system as depicted in FIGURE 3, it should be understood that the temperature detector 11 responds to Seebeck voltages generated by the transducer 10. Because of the construction of the transducer (i.e. other forms of the transducer structure being operated in essentially the same manner; see U.S. Patent No. 3,408,607, issued Oct. 29, 1968), a thermoelectric junction is created between the dissimilar thermoelectric components of the transducer (i.e. segments of the conductors 22 and 23) at each location along the length thereof whereat the transducer is subjected to an environmental temperature condition that differs sufficiently from that of the ambient surroundings to which the free end 10b of the transducer is exposed. In any of the variety of practical applications for the present invention, a plurality of such thermoelectric or Seebeck junctions are typically generated since it is anticipated that the elongated transducer 10 will be exposed to a variety of different temperature conditions along its length. However, the Seebeck voltage generated by the transducer 10 and recorded by the detector 11 will reflect only the maximum temperature condition to which the transducer is exposed inasmuch as the thermoelectric or Seebeck junctions created by less extreme temperature conditions are electrically connected in parallel with this so-called "primary" thermoelectric junction. This characteristic of the transducer 10 has particular utility since the preferred use of the system contemplates the detection and locaion of those temperature conditions which depart from certain preselected limits that are sought to be maintained in the environment being monitored.

In response to the generation of a temperature indicative Seebeck voltage which manifests a departure from preselected limits, as hereinafter more fully described, suitable means associated with the temperature detector 11 initiate the determination of the location of this primary temperature condition of interest. That is, energy is supplied to the transducer from the source 12 through circuit means 16 and 15, and the response of the transducer to this externally supplied energy is monitored through the circuit means 17 by the location detector 13. Preferably, the energy source 12 is a source of constant alternating current which is supplied to the conductor 23 so as to generate a voltage drop across the segment of this conductor which lies between the free or input end 10b of the transducer and the location whereat the thermoelectric junction is created due to the influence of the maximum temperature condition to which the transducer is exposed. Esssentially, a circuit for the externally supplied current is completed through the minimum impedance junction created by this maximum temperature condition and the grounded sheath 21. The interconnected remaining segment of the conductor 23 and the conductor 24, which are connected through the circuit means 17 to the location detector 13, do not draw any substantial current due to the extremely high alternating current input impedance characteristics of the location detector 13. Accordingly, these interconnected conductors function as a means for detecting the voltage drop across the portion of the conductor 23 between the input end 10b and the thermoelectric or Seebeck junction of interest. By means of suitable calibration techniques, the voltage sensed by the location detector 13 is translated into an indication of the length of conductor segment through which the current is supplied and, therefore, yields a direct indication of the location of the temperature condition of interest as measured from the input end of the transducer 10.

Before proceeding with a detailed description of the embodiment shown in FIGURE 3, it should again be recognized that the present invention contemplates a number of transducer structures 10 for carrying out the temperature and location measurements as generally outlined above. In addition, the particlar system described in connection with the embodiment of FIGURE 3 is merely illustrative of a variety of commercially available circuits which might be employed to selectively achieve the basic goals of the present invention, i.e. the sensing and/or recording of temperature conditions which exceed preselected limits, the supply of energy to the transducer in response to the detection of such temperature conditions, and the monitoring of the electrical response characteristics of the transducer to yield a direct indication of the location of these temperature conditions in a reliable and efficient manner, while at the same time eliminating the need for time consuming calculations.

Referring specifically to FIGURE 3, the temperature detector 11 is illustrated as being comprised of a high input impedance direct current amplifier network 31 having a pair of input leads 31a and 31b. Such an amplifier network is exemplified by a model SA–2 Nexus operational amplifier with associated feedback network 32 that renders the amplifier insensitive to AC input signals. As shown, the input lead 31a is connected to the transducer conductor 22 through a resistor 33a and the lead 31b is connected to the conductor 23 through a resistor 33b. In addition, the detector 11 includes a suitable indicating meter 34 that is selectively connectable to the output lead 31c of the amplifier network 31 through a selector switch arrangement 36. The meter 34 is preferably scaled to yield direct temperature readings and preferably is of the type capable of selectively actuating switch elements 34a and 34b that are associated with the location detector 13 and energy source 12, respectively.

The energy source 12 and the location detector 13 are comprised of the remaining components depicted in FIGURE 3. More specifically, the energy source 11 includes a reference oscillator 41 and a constant current source 42 that is connected to the output of the oscillator through a second selector switch arrangement 43 incorporating the switch element 34b. Preferably, the reference oscillator incorporates a model SA–2 Nexus amplifier 41a with associated twin-T feedback networks 44 and 45. In accordance with the invention, the reference oscillator supplies an output signal of constant frequency and amplitude (e.g. a signal having a frequency of 500 c.p.s.) and low harmonic content. Through the use of the positive and negative feedback networks 44 and 45 and a conventional gain feedback network 46, the oscillator output signal has the desired amplitude as well as frequency and harmonic characteristics throughout the period of operation of the system.

As generally outlined above, the output from the oscillator 41 is supplied through the switching arrangement 43 to the input of the constant current source 42, which is also preferably formed by a Nexus SA–2 amplifier 42a connected in circuit with a suitable filter and feedback network 50 that yields the necessary DC stability for this portion of the circuit. As shown, the output from the amplifier 42a is supplied to the primary of an output transformer 51 and the current through the secondary of this output transformer is supplied through a capacitive coupling network 52 to the transducer 10 and more specifically, to the input end of the conductor 23. The current supplied to the secondary of the transformer 51 is monitored by a resistive network 53 and the voltage developed across this network 53 is supplied to the input of the amplifier 42 and compared with the signal derived from the oscillator 41 through a resistive network 54.

Through the use of the voltage comparison technique whereby the signal developed across the secondary of the transformer 51 is compared with the voltage derived from the oscillator 41 at the input to the amplifier 42a, this circuit, in a conventional manner, yields a constant current output which is preferably of the order of one milliamp, peak to peak, for desirable system operation in most typical applications.

The location detector 13, which monitors the electrical response of the transducer 10 to the constant current signal supplied thereto from the source 42, includes a high gain, differential bandpass amplifier network 61 that is connected in circuit with the transducer 10 through a coupling transformer 62. The output from the amplifier network 61, which is preferably formed by still another Nexus SA–2 operational amplifier 61a and associated twin-T feedback network 63 that renders the amplifier sensitive to 500 cycles, is supplied to a suitably scaled location indicating instrument or meter 66 through a full wave rectifier 64 and a selector switch arrangement 65 that includes the switching element 34a. Preferably, the transformer 62 is characterized by low capacitance to ground between windings and provides an extremely high AC input impedance to the location detector 13.

The operation of the embodiment depicted in FIGURE 3 corresponds essentially to that generally outlined above with reference to FIGURE 1. In this connection, the switching arrangement 36, 43, and 65, along with a switching arrangement 71, are preferably ganged so as to facilitate both the calibration of the temperature and location indicating meters 34 and 66 and to provide for selective control over the temperature indicating and/or location detecting operations effected by the system.

More specifically, when the selector switches engage the first of the five contacts which preferably comprise the illustrated switching arrangements, the meters 34 and 66 are shorted to ground and complete meter damping is achieved. In the second position and assuming power is supplied to the system from a suitable power supply (not shown), the calibration of the temperature meter 34 is effected. In the third and fourth positions the location detector is calibrated.

In the third switching position, the switching arrangement 71 provides a resistive shunt across the input to the conductor 23 thus simulating a thermoelectric junction caused by a heating source at this location. The location detector is thus calibrated to reflect this reading as the zero location position on the meter. In the fourth selector switch position, the aforementioned resistive shunt provided by the switching arrangement 71 is connected across the end of the conductor 24. In response to this calibration step and considering the overall length of the interconnected conductors 23 and 24, the maximum distance reading is preset on the meter 66.

In the fifth switch position, current is supplied to the transducer from the output of the source 42, the temperature detecting meter 34 is connected to the amplifier network 31 and the location detecting circuit is conditioned to respond to a high temperature condition so as to effect a location determination with respect to such a condition. In this latter connection, the meter 34, as generally outlined above, incorporates a suitable switch actuating means (not shown) which, in a conventional manner, is conditioned for actuation only when the sensed temperature condition exceeds a preselected setting. When this occurs, the meter switching means responds by closing the normally open contact 34a associated with the switching arrangement 66 and the normally open contact 34b similarly associated with the switching arrangement 43. The closure of the contact 34a facilitates the readout of the location measurement effected in response to the supply of current to the transducer as a result of the cooperative action between the oscillator 41 and source 42. As shown, the contact 34b forms a part of a low impedance shunt across a portion of the switching arrangement 43 when in the fifth switching position and the resistive network 54. With this parallel arrangement of high and low impedance paths at the input to the source 42, discontinuities in system operation are avoided. That is, even though the switch actuating means associated with the meter 34 has not been operated, a selected percentage of the full output current is supplied to the transducer when the system is operating in the detecting mode dictated by the fifth switching position. Thus, when the full output of the constant current source is applied to the transducer 10 the possibility of a large discontinuity occurring as a result of the application of this signal is avoided.

As will be appreciated from the foregoing description, the amplifier network 31 senses the thermoelectric signals generated from the transducer 10 and yields a reading on the meter 34 which indicates the maximum temperature condition to which any segment of the transducer is exposed. If this maximum temperature condition exceeds a preselected limit as preset on the meter 34, the location indicating meter 66 is connected in the output circuit of the full wave rectifier 64. As a result of the supply of constant current to the conductor 23 from the secondary of the transformer 51, a voltage is developed which is sensed by the transformer 62. The resulting signal that is developed across the secondary of this transformer is supplied through the amplifier 61 to the full wave rectifier 64. In accordance with the selective precalibration of the meter 66, the system produces an indication of the relative location of the monitored maximum temperature condition with respect to the input end of the transducer 10.

From the foregoing description, it will be appreciated that the present invention provides improved means for and methods of measuring and/or locating temperature conditions within an environment. It will be understood that the Seebeck voltage generated by the dissimilar conductors 22 and 23 is indicative of the most extreme temperature condition to which the transducer is exposed. Similarly, a corresponding thermoelectric junction which is created between the conductor 23 and the grounded sheath 21 provides a means for completing a circuit for energy supplied from the source 12 such that the voltage drop across the segment of the conductor 23 lying between the input end 10b of the transducer and this primary thermoelectric junction is indicative of the location of the maximum temperature condition in accordance with the selective precalibration of the system. Since the conductor 24 is confined within an insulating material such as magnesium oxide, this member functions solely as a voltage sensing lead and is unaffected by the high temperature conditions that influence the semiconductor material that confines the dissimilar thermoelectric conductors 22 and 23.

It will be appreciated that the foregoing is merely illustrative of one preferred embodiment of the invention. In this connection, various modifications might be made in the structure of the transducer 10 and/or in the other system components without departing from the invention, various features of which are set forth in the accompanying claims.

What is claimed is:

1. A method of sensing and locating a maximum temperature condition of interest existing within an environment, comprising: disposing a thermoelectric transducer within said environment, said transducer comprising at least a pair of conductors formed of dissimilar thermoelectric materials and surrounded by a mass of thermistor material; sensing the thermoelectric signal generated as a result of the junction between said conductors across said thermistor material at the point of highest temperature along said transducer; applying energy to said transducer to establish a voltage drop along that portion of at least one of said conductors lying between the point of application of said energy and said junction; measuring said voltage drop; and translating said voltage drop into an indication of the location of said junction.

2. A method in accordance with claim 1, including the step of translating said thermoelectric signal into an indication of the magnitude of said highest temperature.

3. A method in accordance with claim 1, including the steps of: preselecting a minimum temperature value; and initiating said application of energy to said transducer upon the sensing of a thermoelectric signal indicative of a value for said highest temperature in excess of said preselected minimum value.

4. A method in accordance with claim 1, wherein said energy is applied to said transducer through a circuit which includes said portion of said one of said conductors, said thermistor material, and a conductive sheath for said transducer.

5. A method in accordance with claim 4, wherein said voltage drop is measured by means of a circuit which includes the remaining portion of said one of said conductors, and a third conductor.

6. Apparatus for sensing and locating temperature conditions within an environment comprising: an elongated thermoelectric transducer including a pair of thermocouple conductors, a mass of thermistor material surrounding said conductors, and an outer metallic sheath; first means connected to said conductors for sensing the thermoelectric signal generated as a result of the junction between said conductors across said thermistor material at the point of highest temperature along said transducer; second means for applying energy to said transducer to establish a voltage drop along that portion of at least one of said conductors lying between the point of application of said energy and said junction, wherein said second means is connected to said transducer to apply energy thereto through a circuit including said sheath, said thermistor material, and said portion of said one of said conductors; and third means for measuring said voltage drop, wherein said third means is connected to said transducer for measuring said voltage drop by means of a circuit which includes the remaining portion of said one conductor and a third conductor.

7. Apparatus in accordance with claim 6, wherein said first means includes indicating means calibrated to translate said signal into an indication of the magnitude of said highest temperature.

8. Apparatus in accordance with claim 6, wherein said third means includes indicating means calibrated to translate said voltage drop into an indication of the location of said highest temperature.

9. Apparatus in accordance with claim 6, including automatic switch means operable in response to said signal to connect said second means to said transducer when the value of said signal indicates a temperature in excess of a preselected value.

References Cited

UNITED STATES PATENTS

| | | | |
|---|---|---|---|
| 2,805,272 | 9/1957 | Postal. | |
| 3,307,401 | 3/1967 | Bachman | 73—359 |
| 2,571,605 | 10/1951 | Peters | 73—362 X |
| 3,187,080 | 6/1965 | Ball | 174—11 |
| 3,287,634 | 11/1966 | Collins | 324—52 |

JOHN W. CALDWELL, Primary Examiner

D. L. TRAFTON, Assistant Examiner

U.S. Cl. X.R.

73—341, 344, 359; 324—52; 340—227